(12) United States Patent
Johansen et al.

(10) Patent No.: US 7,684,489 B2
(45) Date of Patent: Mar. 23, 2010

(54) METHOD AND APPARATUS FOR VIDEO COMPRESSION

(75) Inventors: Tom-Ivar Johansen, Oslo (NO); Gisle Bjøntegaard, Oppegard (NO)

(73) Assignee: Tandberg Telecom AS, Lysaker (NO)

( * ) Notice: Subject to any disclaimer, the term of this patent is extended or adjusted under 35 U.S.C. 154(b) by 1215 days.

(21) Appl. No.: 10/844,054

(22) Filed: May 12, 2004

(65) Prior Publication Data

US 2004/0233993 A1    Nov. 25, 2004

(30) Foreign Application Priority Data

May 22, 2003    (NO) .................................. 20032319

(51) Int. Cl.
*H04N 7/12*    (2006.01)
(52) U.S. Cl. ..................... 375/240.18; 375/240.01; 375/240.02; 375/240.03; 375/240.16; 375/240.2
(58) Field of Classification Search .................. None
See application file for complete search history.

(56) References Cited

U.S. PATENT DOCUMENTS

| 4,924,309 | A | | 5/1990 | Harnack et al. | |
|---|---|---|---|---|---|
| 5,434,567 | A | | 7/1995 | Mack et al. | |
| 5,440,344 | A | * | 8/1995 | Asamura et al. | 375/240.04 |
| 5,489,947 | A | * | 2/1996 | Cooper | 348/589 |
| 6,157,740 | A | * | 12/2000 | Buerkle et al. | 382/233 |
| 6,256,347 | B1 | | 7/2001 | Yu et al. | |
| 6,542,162 | B1 | * | 4/2003 | Hrusecky et al. | 345/629 |
| 7,295,609 | B2 | * | 11/2007 | Sato et al. | 375/240.03 |
| 2002/0196853 | A1 | * | 12/2002 | Liang et al. | 375/240.16 |
| 2003/0043921 | A1 | | 3/2003 | Dufour et al. | |
| 2005/0013497 | A1 | * | 1/2005 | Hsu et al. | 382/239 |

* cited by examiner

*Primary Examiner*—Andy S. Rao
*Assistant Examiner*—Geepy Pe
(74) *Attorney, Agent, or Firm*—Oblon, Spivak, McClelland, Maier & Neustadt, L.L.P.

(57) ABSTRACT

A unified solution to coding/decoding of different video formats such as 4:2:0, 4:2:2 and 4:4:4 is provided. A method of video coding includes transforming a first m×n macro block of residual chrominance pixel values of moving pictures by a first integer-transform function generating a corresponding second m×n macro block of integer-transform coefficients, further transforming DC values of the integer-transform coefficients by a second integer-transform function to generate a third block of integer-transformed DC coefficients. The method further includes generating the second m×n macro block of integer-transform coefficients by utilizing a k×k integer-transform function on each k×k sub-block of the first m×n macro block, wherein n and m are each a multiple of k, and generating the third block of coefficients by utilizing a second i×j integer-transform function on the DC values resulting in a (m/k)×(n/k) third block of integer-transformed DC coefficients.

14 Claims, 2 Drawing Sheets

METHOD AND APPARATUS FOR VIDEO COMPRESSION

RELATED APPLICATION

This application claims priority under 35 U.S.C. §119 or 365 to Norwegian Application No. 20032319, filed May 22, 2003. The entire teachings of the above application are incorporated herein by reference.

BACKGROUND

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte) or more. Such uncompressed video data results in large bit volumes, and cannot be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on vectors representing movements. The prediction process is typically performed on square block sizes (e.g. 16×16 pixels).

Note that in some cases, such as in H.264/AVC, predictions of pixels based on the adjacent pixels in the same picture rather than pixels of preceding pictures are used. This is referred to as intra prediction, as opposed to inter prediction. In H.264/AVC, there are many different modes for doing such prediction both for luminance blocks and chrominance blocks. One of the prediction modes is called DC-prediction. It predicts all pixels in a block to have the same value. When we take into account the characteristics of the particular transform that is used for residual coding it means that only the DC coefficient of the residual block data is changed compared to transformation of the block data without prediction. All AC-coefficients are unchanged. For this reason the prediction mode is named DC-prediction.

The residual represented as a block of data (e.g. 4×4 pixels) still contains internal correlation. A well-known method of taking advantage of this is to perform a two dimensional block transform. In H.263 an 8×8 Discrete Cosine Transform (DCT) is used, whereas H.264 uses a 4×4 integer type transform. This transforms 4×4 pixels into 4×4 transform coefficients and they can usually be represented by fewer bits than the pixel representation. Transform of a 4×4 array of pixels with internal correlation will probability result in a 4×4 block of transform coefficients with much fewer non-zero values than the original 4×4 pixel block.

A macro block is a part of the picture consisting of several sub blocks for luminance (luma) as well as for chrominance (chroma).

There are typically two chrominance components (Cr, Cb) with half the resolution both horizontally and vertically compared with luminance. This is in contrast to for instance RGB (red, green, blue) which is typically the representation used in the camera sensor and the monitor display.

From the patent literature there are examples disclosing video encoding/decoding and methods of compression. In particular the U.S. Pat. No. 6,256,347 B1 (Yu et al.) should be mentioned, which discloses an image processor that receives prediction error values from decompressed MPEG coded digital video signals in the form of pixel blocks containing luminance and chrominance data in a 4:2:2 or 4:2:0 format and recompresses the pixel blocks to a predetermined resolution. Luminance and chrominance data are processed with different compression laws during recompression. Luminance data are recompressed to an average of six bits per pixel, whereas chrominance data are recompressed to an average of four bits per pixel. Thus Yu et al. discloses a method for bit compression of data on 4:2:2 and 4:2:0 formats, and hence is not a general method applying to a plurality of formats.

Further it should be mentioned that US 2003/0043921 A1 (Dufour et al.) discloses a method for video encoding applied to an input signal which includes a sequence of frames represented by a luminance matrix and two chrominance matrices.

Most video coding standards are mainly designed for 4:2:0. MPEG2 professional profile covers 4:2:2 using a special chrominance block arrangement. The same is true for H.263. Generally this means that each format needs a special solution.

SUMMARY

The invention is related to handling various picture resolution in an extended version of the compression standard H.264/AVC or other similar standards.

The present invention provides a unified solution to coding/decoding of different video formats such as 4:2:0, 4:2:2 and 4:4:4.

In particular, the present invention provides a method of video coding for transforming a first m×n macro block of residual chrominance pixel values of moving pictures by a first integer-transform function generating a corresponding second m×n macro block of integer-transform coefficients, then further transforming DC values of the integer-transform coefficients by a second integer-transform function to generate a third block of integer-transformed DC coefficients, wherein the method further includes the steps of generating the second m×n macro block of integer-transform coefficients by utilizing a k×k integer-transform function on each k×k sub-block of the first m×n macro block, wherein n and m are each a multiple of k, and then generating the third block of coefficients by utilizing a second i×j integer-transform function on the DC values resulting in a (m/k)×(n/k) third block of integer-transformed DC coefficients.

The present invention also provides a method of video decoding, being an inverted version of the method of video coding.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 shows one component of chroma pixels in a macro block of different picture formats.

FIG. 3 shows a second level transform of DC values for different formats.

FIG. 4 indicates the basis of a DC prediction of an 8×16 block.

DETAILED DESCRIPTION

Figure 1:
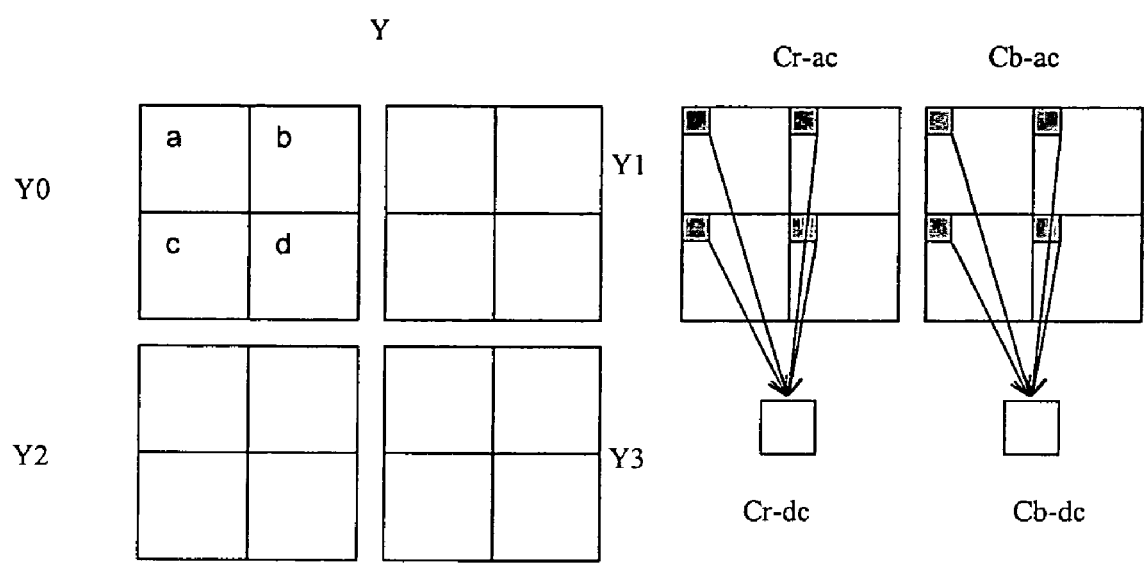
FIG. 1 shows how a macro block with the 4:2:0 format of 16×16 luma pixels and two chroma components with 8×8 pixels each are divided into 4×4 blocks which in turn are arranged in subgroups of four 4×4 blocks. It is also shown how DC coefficients are extracted from each of 4 chroma blocks to form separate chroma dc elements consisting of 2×2 blocks.

The present invention provides an extension of the H.264/AVC video coding standard to include formats like the above-described 4:2:2 and 4:4:4. The method is based on the way chrominance is already treated in H.264/AVC. A macroblock consist of a part of the picture with 16×16 luminance pixels and two chrominance components with 8×8 pixels each. This is illustrated in FIG. 1.

The description is mainly related to the encoding process. However, this has implications to how decoding must be performed. This means for instance that if transformation is performed on two levels at the encoder, the decoder must perform inverse transformation on two levels. Generally the word "coding" is often used as a short expression to include the whole process of encoding and decoding. The invention covers the whole coding process which is defined to contain both encoding and decoding.

As noted, FIG. 1 shows the macro block consists of 16×16 luminance pixels and two chrominance components with 8×8 pixels each. Each of the components is further broken down into 4×4 blocks, which are represented by the small squares. For coding purposes, both luma and chroma 4×4 blocks are grouped together in 8×8 sub blocks and designated Y0-Y3 and Cr, Cb. The chroma part of this format is in some contexts denoted as 4:2:0, and is shown to the left in FIG. 2. The abbreviation is not very self-explanatory. It means that the chrominance has half the resolution of luminance horizontally as well as vertically. For the conventional video format CIF, this means that a luminance frame has 352×288 pixels whereas each of the chrominance components has 176×144 pixels.

Figures 2, 3, 4:
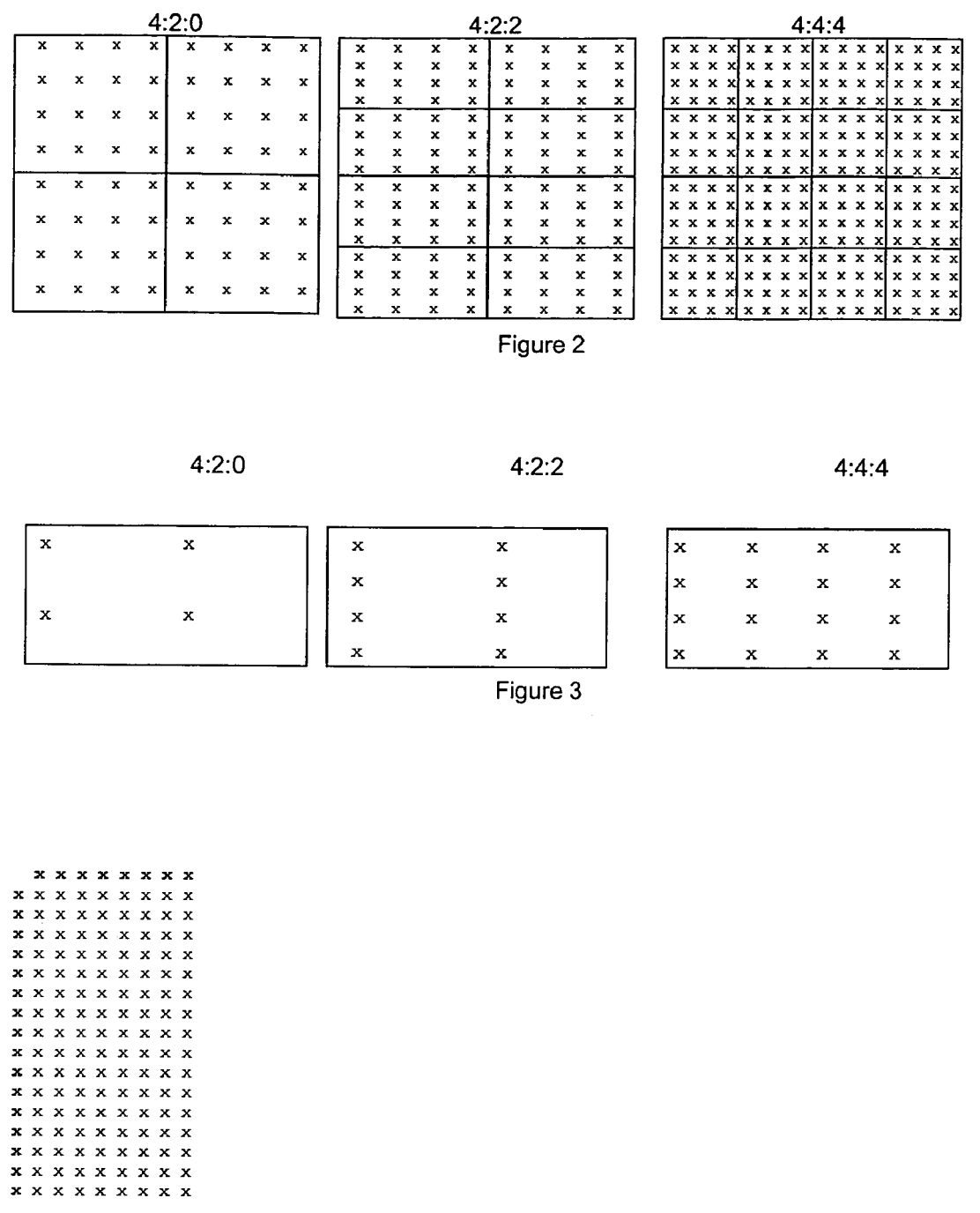

In an alternative format, denoted 4:2:2 and shown in the middle part of FIG. 2, chrominance has half of the luminance resolution in the horizontal direction and the same resolution as luminance in the vertical direction. This format is typically used for high quality interlaced TV signals where the interlace structure causes some challenges for use of half chrominance resolution vertically.

In still an alternative format, denoted 4:4:4 and shown to the right in FIG. 2, that luminance and chrominance signals have the same resolution both in the horizontal and vertical direction. One typical area of application is graphics material where colors are used in a way such that it is desirable to have the same resolution for chrominance as for luminance.

The first aspect of the present invention is related to the coding describing the residual signal. In H.264/AVC the chrominance residual signal is described with two level transforms. The 4:2:0 box in FIG. 2 indicates that the 8×8 pixel chrominance block is divided into 4×4 pixel sub-blocks. The residual signal in each of the 4×4 sub-blocks undergo a 4×4 transformation resulting in one DC coefficient and 15 AC coefficients. The DC coefficient represents the average value over the 4×4 block.

According to the first aspect of the present invention, the 4×4 block size of the first transform of the chrominance residual signal is maintained. The number of such sub-blocks will then be different for the different picture formats. In a general denotation, a k×k transform is used on a macro block of m×n (m in the horizontal direction, n in the vertical direction) chrominance pixels.

A further transformation of the DC coefficients of each of the 4×4 blocks undergo a 2×2 transform as indicated in FIG. 3. In the general case, an i×j transform for the DC coefficients is used. i and j will have values such that i×k=horizontal number of chrominance pixels in a macroblock and j×k=vertical number of chrominance pixels in a macroblock. The transform type is preferably chosen to be two-dimensional Hadamard transform.

The present invention also relates to intra prediction part of the coding. In a preferred embodiment of the invention, DC-prediction for the 4:2:2 format is provided. DC-prediction predicts one value for a whole block. In this case we want to predict one value for all the pixels in an 8×16 block from the neighboring, already coded and decoded pixels. This is indicated in FIG. 4 where the 8×16 shall be predicted from the 24 neighboring pixels in bold.

A natural prediction would be to take the average of all 24 bold pixels:

Prediction=Sum(24 neighboring pixels)/24

However, it is desirable to avoid the division by 24. Therefore we use the following definition:

Prediction=(2×Sum(8 pixels above)+Sum(16 pixels to the left))/32

In this way, the division by 32 can easily be implemented with a shift operation.

To take advantage of the shift operation in the general case, the DC-prediction has to be executed on rectangular blocks of size $2^q \times 2^r$ where q and r are integers; q>r; q is defined to represent a first dimension of the block; and r is defined to represent a second dimension of the block. The first dimension may represent the vertical size and the second dimension may represent the horizontal size of the block or visa versa. DC prediction of the block is formed as:

Prediction=(Sum(neighboring pixels to the first dimension)+$2^{(q-r)}$×(Sum(neighboring pixels to the second dimension))/$2^{q+1}$ It follows from the discussion above that $m=2^q$ and $n=2^r$.

With the present invention, the first level transform is kept unchanged in the sense that the chrominance pixels of a macroblock is divided into 4×4 subblocks as indicated in 4:2:2 and 4:4:4 of FIG. 2 and each subblock undergo a 4×4 transform. The second level transform of DC coefficients will be of size 2×4 and 4×4 for the two higher formats as depicted in FIG. 3. Hence the main difference between coding the different formats is the second order residual chrominance transform.

Note that the scope of the present invention is not limited to the H.264/AVC. It could advantageously also be utilized in connection with other video coding standards like e.g. SIP.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of video coding comprising:
   transforming, with an encoding device, a first m×n macro block of residual chrominance pixel values of moving pictures, of a 4:2:2 format or a 4:4:4 format, by a first integer-transform function, thereby generating a corresponding second m×n macro block of integer-transform coefficients, the transforming including generating the second m×n macro block of integer-transform coefficients by utilizing a 4×4 integer-transform function on each 4×4 sub-blocks of the first m×n macro block, wherein each of n and m is a multiple of 4; and
   transforming, with the encoding device, DC values of the integer-transform coefficients by a second integer-transform function, thereby generating a third block of integer-transformed DC coefficients, the transforming including generating the third block of coefficients by utilizing i×j integer-transform function, wherein i=m/4 and j=n/4, on the DC values resulting in a (m/4)×(n/4) third block of integer-transformed DC coefficients.

2. A method according to claim 1, wherein m=16 and n=8.

3. A method according to claim 1, wherein m=16 and n=16.

4. A method according to claim 1, wherein the second integer-transform function is a Hadamard transform.

5. A method according to claim 1, further including:
   predicting one DC value associated with the first m×n macro block by means of m above-lying neighboring pixels (alnp) and n left-lying neighboring pixels (llnp) according to the following expression:

(2×(sum of m alnp))+(sum of n llnp)/2×m.

6. A method according to claim 5, wherein m=8 and n=16 and the division in the expression is executed by a shift operation.

7. A method of video decoding comprising:
   transforming, with a decoding device, a first block of integer-transformed DC coefficients, of a 4:2:2 format or a 4:4:4 format, by a first inverse integer-transform function, thereby generating a number of DC values of a first m×n macro block of integer-transform coefficients, the transforming including generating the number of DC values of the first m×n macro block of integer-transform coefficients by utilizing a first i×j inverse integer-transform function, wherein i=m/4 and j=n/4, on the first block of integer-transformed DC coefficients; and
   transforming, with the decoding device, the first m×n macro block of integer-transform coefficients by a second inverse integer-transform function, thereby generating a second m×n macro block of residual chrominance pixel values of moving pictures, the transforming including generating the second m×n macro block of residual chrominance pixel values by utilizing a 4×4 inverse integer-transform function on each 4×4 sub-blocks of the first m×n macro block of integer-transform coefficients, wherein n and m is a multiple of 4, and the first block of integer-transformed DC coefficients is of the size (m/4)×(n/4).

8. A method according to claim 7, wherein m=16 and n=8.

9. A method according to claim 7, wherein m=16 and n=16.

10. A method according to claim 7, wherein the first inverse integer-transform function is a Hadamard transform.

11. An apparatus for video coding comprising:
    means for transforming a first m×n macro block of residual chrominance pixel values of moving pictures, of a 4:2:2 format or a 4:4:4 format, by a first integer-transform function, thereby generating a corresponding second m×n macro block of integer-transform coefficients, the means for transforming including means for generating the second m×n macro block of integer-transform coefficients by utilizing a 4×4 integer-transform function on each 4×4 sub-blocks of the first m×n macro block, wherein each of n and m is a multiple of 4; and
    means for transforming DC values of the integer-transform coefficients by a second integer-transform function, thereby generating a third block of integer-transformed DC coefficients, the means for transforming including means for generating the third block of coefficients by utilizing a second i×j integer-transform function, wherein i=m/4 and j=n/4, on the DC values resulting in a (m/4)×(n/4) third block of integer-transformed DC coefficients.

12. The apparatus according to claim 11, wherein m=16, and n=8 or 16.

13. An apparatus for video decoding comprising:
    means for transforming a first block of integer-transformed DC coefficients, of a 4:2:2 format or a 4:4:4 format, by a first inverse integer-transform function, thereby generating a number of DC values of a first m×n macro block of integer-transform coefficients, the means for transforming including means for generating the number of DC values of the first m×n macro block of integer-transform coefficients by utilizing a first i×j inverse integer-transform function, wherein i=m/4 and j=n/4, on the first block of integer-transformed DC coefficients; and
    means for transforming the first m×n macro block of integer-transform coefficients by a second inverse integer-transform function, thereby generating a second m×n macro block of residual chrominance pixel values of moving pictures, the means for transforming including means for generating the second m×n macro block of residual chrominance pixel values by utilizing a 4×4 inverse integer-transform function on each 4×4 sub-blocks of the first m×n macro block of integer-transform coefficients, wherein n and m is a multiple of 4, and the first block of integer-transformed DC coefficients is of the size (m/4)×(n/4).

14. The apparatus according to claim 13, wherein m=16, and n=8 or 16.

* * * * *